_United States Patent Office_

3,682,585
Patented Aug. 8, 1972

3,682,585
REMOVAL OF PARAMAGNETIC GASES
Ludo K. Frevel, Midland, and Leonard J. Kressley, Saginaw, Mich., assignors to The Dow Chemical Company, Midland, Mich.
No Drawing. Continuation of application Ser. No. 703,822, Jan. 2, 1968, which is a division of application Ser. No. 572,234, Aug. 15, 1966, which is a continuation-in-part of application Ser. No. 305,513, Aug. 30, 1963, which in turn is a continuation-in-part of application Ser. No. 195,392, May 17, 1962. This application Feb. 24, 1971, Ser. No. 118,521
Int. Cl. B01d 53/34
U.S. Cl. 423—219
10 Claims

ABSTRACT OF THE DISCLOSURE

In removing a paramagnetic gas such as $O_2$, NO, $NO_2$, $ClO_2$ and $O_3$ from a gas stream containing the same, the gas to be purified is passed over finely divided copper reactant impregnated on a high surface area gamma-alumina. The gamma-alumina essentially contains from about 0.1 to 1.5 percent by weight of sodium oxide within the alumina crystals. The copper reactant may contain up to 45 percent by weight of a metal such as silver, platinum, palladium, manganese, nickel, cobalt, chromium, molybdenum, and mixtures thereof. The gas is passed over the prepared reduced reagent within an enclosed zone while the gas and the reagent are at most any temperature above about −200° C. Removal of paramagnetic gas is particularly effective even at substantial flow rates and efficiency of removal remains surprisingly high until the reduced metal of the reagent has substantially reacted with the paramagnetic gas. When removal efficiency drops, the flow of gas to be purified is stopped or directed to another bed of reagent while the first bed is regenerated by reduction with hydrogen gas at an elevated temperature.

CROSS REFERENCE TO RELATED APPLICATIONS

This application is a continuation of our copending application Ser. No. 703,822, filed Jan. 2, 1968, which is a divisional application based on application Ser. No. 572,234, filed Aug. 15, 1966, which is a continuation-in-part of prior application Ser. No. 305,513, filed Aug. 30, 1963, which in turn is a continuation-in-part of application Ser. No. 195,392, filed May 17, 1962, all said applications now abandoned.

This invention relates to a novel reagent, the method of using the reagent to selectively remove contaminant paramagnetic gases from a gaseous medium, usually a gas stream, containing the same, and to the method of preparing the said reagent.

The methods of removing paramagnetic gaseous oxides employed heretofore have depended upon the use of (1) an aqueous, absorbent or reactant solution, (2) the use of dry materials which must be heated to an elevated temperature, such as 400°–700° C., (3) the use of a dry reactive material, which must be heated, in conjunction with an added reactant such as hydrogen, or (4) the use of a copper reactant dispersed on a magnesium silicate support. The first method is usually disadvantageous because of the addition of undesired water vapor to the stream. The second and third methods have the disadvantage that the reagent must be heated, and usually a volatile product such as water is formed, which must in turn be removed from the stream. The fourth method suffers from the disadvantage that paramagnetic gases are removed at high efficiency only until slight total loading of the reagent has taken place when the efficiency of removal falls off very rapidly with additional loading.

Therefore, it is a principal object of the present invention to provide a method of removing contaminant paramagnetic gases from a gas by a method in which no volatile product is produced.

Another object of the invention is to provide a method of removing paramagnetic gases by a method in which the gas stream and the reactant need not be heated.

Another object of the present invention is to provide a method of removing paramagnetic gases by a method in which there is employed a dry, solid reagent.

Another object of the invention is to provide a method of removing paramagnetic gases from a gas at high dynamic efficiency and at large reagent-bed-capacity, whereby the reagent bed need be regenerated only infrequently.

A further object of the invention is to provide a regenerable reagent for the removal of paramagnetic gas from a gas containing the same.

Yet another object of the invention is to provide a reagent suitable for use in the method of the invention.

The present reagent and the use thereof is based on the discovery that upon passing a gas stream containing a paramagnetic gas over a reagent comprising extremely finely-divided copper as a reactant dispersed on a medium to fine particle size gamma-alumina support and maintained in an enclosed zone, the concentration of paramagnetic gas is effectively reduced or substantially eliminated.

The reagent of the present invention consists of two integral parts, viz., finely-dispersed copper as reactant, and, a support material. Preferably, the copper is itself admixed with one or more very finely-divided activator metals selected from polyvalent metals whose oxides are reducible by hydrogen or a hydrogen-nitrogen mixture at temperature below about 350°–400° C. Preferably, the total amount of activator metal admixed with copper metal does not exceed about 45 percent by weight of the combined weight of copper plus activator metal, and more preferably, does not exceed about 20 percent by weight when it is desired to keep reagent costs lower. Examples of suitable activator metals are silver, platinum, palladium, manganese, nickel, cobalt, chromium and molybdenum.

The reactant support employed is a gamma-alumina having a high surface area (BET surface area) of at least 10 square meters per gram and particle sizes in the range of those substantially passing a No. 8 sieve (U.S. Sieve Series) to those passing a No. 18 sieve, but generally retained on a No. 30 sieve. It is also essential that the gamma-alumina contain about 0.1 to 1.5 percent by weight of sodium, present in combined form with the alumina and reported as $Na_2O$. A finer grade of gamma-alumina may be employed if the gamma-alumina is first granulated to provide particle sizes in the specified range.

In carrying out the preparation of the present reagent, a relatively concentrated aqueous solution containing copper is prepared by dissolving about 2.5 to 3 parts by weight of any of the copper salts readily soluble in water, for example, $CuSO_4 \cdot 5H_2O$, $Cu(NO_3)_2 \cdot 3H_2O$ or $$CuCl_2 \cdot 2H_2O$$

in 1 part by weight of water. More preferably, the water is acidified with about 5 to 10 percent by weight of a mineral acid such as $HNO_3$ or $H_2SO_4$. The water-soluble salts of any activator metals to be employed are dissolved in the copper salt solution in the requisite amount to provide up to 45 percent of activator metal based on the weight of the copper formed on reduction of the salt. This concentrated aqueous solution is poured onto a quantity of gamma-alumina in the requisite amount to provide from about 3 to about 13 percent by weight of reduced metal based on the total weight of the prepared agent. The mixture is stirred briefly and then dried, as in a 110°–160° C. oven, and then roasted at a temperature of about 250°–400° C., and more preferably 290–400° C. During roasting, the copper salts and activator metal salts are converted to oxides or anhydrous metal salts in such a manner that a single phase is formed with the alumina, as determined on examination by X-ray diffraction. This step is not completely understood but is essential to the proper preparation of the present highly efficient, high capacity reagent.

Preparation of the reagent in reduced metal form is completed upon passing a stream of hydrogen, more preferably a mixture of hydrogen and nitrogen, over a bed of the roasted material for about 30 minutes or more while the bed is maintained at a temperature of about 100°–400° C., thus reducing the roasted material to metal form. About two times the stoichiometric amount of hydrogen suffices to make the reduction as complete as desired. The resulting reagent consists of extremely finely divided copper, with or without admixed activator metal, intimately and widely dispersed throughout a high surface area gamma-alumina.

While earlier known reagents when freshly prepared exhibit a higher efficiency after having been reoxidized once and again reduced, the present reagent does not need such activation treatment, though activation treatment does not adversely affect the performance of the reagent.

However, the reduction or regeneration temperature critically affects the dynamic efficiency of the reagent. The higher the temperature at regeneration, the higher the efficiency during subsequent use over a longer term of use. Moreover, the bed capacity is larger. If regeneration temperatures are unduly high, support degeneration tends to occur with resulting lowering in reagent efficiency and capacity. Generally, a regeneration temperature of about 250–300° C. is preferred, and especially a temperature of about 270° C.

The prepared and reduced reagent is used according to the present invention by simply placing it in an enclosed zone or tube in which there is obtained intimate contact between the reagent and the gas flowing through the enclosed zone. The reagent need not be heated since it is effective at temperatures as low as Dry Ice (−78° C.) and liquid nitrogen (−196° C.) Ambient room temperature is adequate and generally most convenient, though higher temperatures may be employed if desired. Since one of the advantages of the present reagent and the method of using it is the great efficiency and capacity obtained at the highly convenient ambient room temperature, temperatures above about 100° C. will generally not be employed unless it is necessary to keep a high boiling liquid in the vapor state.

The pressure of the gas stream is believed to have little, if any, effect on the process.

Gases which are readily selectively reacted with the reagent are any of the paramagnetic gases. Such gases include $O_2$, $NO$, $NO_2$, $ClO_2$ and $O_3$. These paramagnetic gases may be removed by the present reagent from gas streams made up primarily of (1) rare gases such as helium, argon, krypton, (2) inorganic gases such as carbon dioxide, hydrogen and nitrogen, and (3) hydrocarbon gases, such as the lower gaseous alkanes, olefins, e.g., ethylene, propylene and the butylenes.

Streams of such gases containing up to 1,000 to 5,000 parts per million of paramagnetic gas may be passed over the present reagent at a temperature such as ambient room temperature at a rate as high as about 2,000 to 5,000 liters per hour per liter of reagent bed volume. Under such conditions, oxygen contamination in a gas stream is reduced to less than 10 parts per million, and generally less than 1 part per million. In general, the use of a higher weight percent of reactant metal in the reagent and lower flow rates through the bed permit more effective removal of the paramagnetic gas.

When the reagent approaches exhaustion, i.e., begins to lose effectiveness, the flow of the gas stream through the bed is halted, or, preferably, switched by valving to an alternate bed, while the exhausted bed is regenerated by again reducing the reactant metal with a stream of hydrogen or hydrogen-nitrogen while the bed is maintained at an elevated temperature of about 100° to 400° C., as in the initial reagent preparation.

To illustrate the reagent of the invention and the method of using the same, reagents were prepared as follows:

(A) A portion of gamma-alumina containing 0.1 to 1.5 percent by weight $Na_2O$ and having particle sizes substantially all passing a No. 8 to a No. 18 sieve (U.S. Sieve Series) was impregnated with an aqueous solution of cupric sulfate and nickel sulfate containing 99 parts of copper per part of nickel. The impregnated gamma-alumina was dried and roasted, thus converting the metal salts to a light green mixed oxide of copper and aluminum present as a single phase. The roasted material was then treated with a mixture of nitrogen and hydrogen at a temperature of 290° C. for a sufficient period (about 3 hours) for the oxides to be reduced to the metal. The total metal content of the resulting reagent was about 5 percent by weight. The BET surface area of the reagent was found by test to be 215 square meters per gram. The carbon monoxide chemisorption capacity of the reagent was found to be 1.1 cubic centimeters per gram.

(B) 38.5 grams of activated alumina containing 0.1 to 1.5 percent by weight $Na_2O$ and having particle sizes substantially all passing a No. 8 to a No. 18 sieve was impregnated with 14 milliliters of an aqueous solution containing 8.7 grams of $Cu(NO_3)_2 \cdot 3H_2O$ and 0.89 gram of $AgNO_3$. The impregnated alumina was dried for one hour at 10° C., then roasted at 350° C. for three hours to form a light green mixed oxide of copper and aluminum present as a single phase, and finally, the oxide was reduced at 290° C. with a nitrogen-hydrogen mixture to yield alumina impregnated with black, finely-divided metal. The metal consisted of 90 percent of copper and 10 percent of silver. The metal content of the reagent prepared was about 6.5 weight percent.

(C) A portion of activated gamma-alumina containing 0.1 to 1.5 percent by weight $Na_2O$ and having particle sizes substantially all passing a No. 8 to a No. 18 sieve was impregnated with an aqueous solution of cupric nitrate and silver nitrate containing 4 parts of copper per part of silver. The impregnated alumina was dried for one hour at 110° C., then roasted at 350° C. for three hours to form a light green mixed oxide of copper and aluminum present as a single phase, and finally, this oxide was reduced at 290° C. with a nitrogen-hydrogen mixture to yield alumina impregnated with black, finely-divided metal. The metal consisted of 80 percent by weight of copper and 20 percent by weight of silver. The metal content of the reagent was 6.8 weight percent.

(D) 41.5 grams of an activated gamma-alumina having a BET surface area greater than 10 square meters per gram containing 0.1 to 1.5 percent by weight $Na_2O$ and having particle sizes substantially all passing a No. 8 to a No. 18 sieve was impregnated with 12 milliliters of an aqueous solution containing 6.8 grams of $Cu(NO_3)_2 \cdot 3H_2O$ and 5.45 grams of $Ni(NO_3)_2 \cdot 6H_2O$. The impregnated alumina was dried for 2 hours at 110° C. and then roasted at 350° C. for 3 hours to form a light green mixed oxide of copper and aluminum present as a single phase. Reduction of the copper and nickel oxides to the respective metals was effected with hydrogen at 400° C. The reduced metal consisted of 3 parts of copper per 2 parts by weight of nickel. The metal content of the reagent was about 6.6 weight percent.

These reagents were used to remove oxygen from various gases under various conditions. The conditions and extent of removal are listed in Table I. The plant $N_2$ (nitrogen) referred to in Table I is obtained from an air plant and is pure enough for general use, containing some moisture and finely-atomized oil, as well as about 2 to 50 parts per million (p.p.m.) of oxygen.

The metal content of the reagents A–D can be approximately doubled, if desired, by impregnating the alumina a second time (1) after roasting, (2) after final reduction or (3) after use. For example, in the case of reagent D above, a second impregnation after roasting increases the metal content on reduction to about 13 percent by weight.

Thereafter, about 128 grams of the dried and roasted impregnated alumina was packed as a bed in a column consisting of a length of iron pipe having an inner diameter of 1 inch and a length of 8 inches, retaining screens top and bottom and pipe connections at each end for passing various gases through the bed of reagent contained therein. The column was also provided with heating means. A stream of hydrogen containing about 90 percent by volume of nitrogen was passed through the column while the impregnated alumina was maintained at a temperature of about 100° C. Reduction of the copper oxide and activator metal oxides to metallic form was completed in about 30 minutes. Most of the reduced metal

TABLE I

| Test No. | Reagent | Duration of run, hours | Stream temp., ° C. | Space velocity, liter/hr. | $O_2$ in feed, p.p.m. | $O_2$ in product, p.p.m. | Nature of gas stream, remarks |
|---|---|---|---|---|---|---|---|
| 1 | 99% Cu-1% Ni supported on gamma-alumina.a | 64 | 25 | 500 | 5–20 | <1 | Plant $N_2$ passed over c 350 ml. bed at 3 liters/min. |
| 2 | do.a | 0.75 | 25 | 500 | 5,000 | 1 | Cylinder $N_2$ plus added $O_2$. |
| 3 | do.a | 5 | 25.5 | 500 | 4 | <1 | Cylinder argon. |
| 4 | do.a | 48 | 25.5 | 500 | 90 | 1 | Ethylene-nitrogen mixture. |
|   |   | 22 | 25.5 | 500 | 90 | 1–15 | Ethylene-nitrogen mixture content with re-reduced reactant. |
| 5 | do.a | 5 | 25 | 500 | 55 | <1 | Cylinder $H_2$. |
| 6 | do.a | 25 | −78 | 500 | 4–50 | <1 | Plant $N_2$. |
| 7 | do.a | 19 | −196 | 220 | 30 | <1 | $H_2$ (inlet tube and reactor cooled in liquid $N_2$). |
| 8 | 90% Cu-10% Ag-supported on gamma-alumina.b | 16 | 25 | 220 | 2,000 | <1 | Plant $N_2$ plus added air. |
| 9 | do.b | 45 | 25 | 220 | 5–50 | <1 | Plant $N_2$. |
| 10 | do.b | 1.5 | 25 | 220 | 3,000 | <1 | Plant $N_2$ plus added air. |
| 11 | 80% Cu-20% Ag-supported on activated alumina.c | 26 | 25 | 480 | 2,000 | 0.15 | Plant $N_2$ plus added $O_2$. |
| 12 | 60% Cu-40% Ni-supported on activated alumina.d | 16 | 25 | 480 | 2,000 | 0.6 | Plant $N_2$ plus added air 22 ml. bed, 18 g. reagent. |
| 13 | do.d | 2.5 | 25 | 480 | 3,000 | 0.2 | Do. |
| 14 | do.d | 17.5 | 25 | 480 | 1,000 | 0.1 | Do. | a Metal content about 5%, preparation A.
b Metal content about 6.5%, preparation B.
c Metal content about 6.8%, preparation C.
d Metal content about 6.6% preparation D.

One of the reagents of the invention prepared as described hereinabove in paragraph (C), was employed in tests in which, respectively, NO and $NO_2$ were removed from a stream of helium. The results of the tests are listed in Table II.

was in the amorphorus form, while minor amounts were in crystalline forms.

In a series of runs carried out to demonstrate the high efficiency and high capacity of the present reagent as well as to show the effect of temperature levels during re-

TABLE II

| Test No. | Reagent | Duration of run, hours | Stream temp., ° C. | Space velocity, liter/hr. | Nitrogen oxide in— Feed | Nitrogen oxide in— Product | Nature of gas stream, remarks |
|---|---|---|---|---|---|---|---|
| 15 | 80% Cu-20% Ag supported on activated alumina.e | 1.6 | 25 | 480 | 10,000 p.p.m. of NO. | 1 p.p.m. of NO. | 1% NO in pure He, some $N_2O$ formed. |
| 16 | do | 19 | 25 | 48 | 1,000 p.p.m. of NO. | 0.5–1.4 p.p.m. of $NO_2$. | NO plus ½ $O_2$ added in stoichiometric amounts to pure helium. | e Preparation C.

As an additional example of the reagent of the present invention and the method of preparing and using the same 10 grams of $Ni(NO_3)_2 \cdot 6H_2O$, 4 grams of $Co(NO_3)_2 \cdot 6H_2O$, 4 grams of $Cr(NO_3)_3 \cdot 9H_2O$, 8 grams of 50 percent by weight $Mn(NO_3)_2$ aqueous solution and 1.0 gram of $AgNO_3$ were dissolved in an aqueous solution consisting of 100 milliliters of water plus 10 milliliters of concentrated nitric acid (16 normal). After solution of the above salts was complete, 280 grams of $Cu(NO_3)_2 \cdot 3H_2O$ were dissolved in solution yielding a total of 240 milliliters of impregnating solution. This impregnating solution was dispersed on 747 grams of gamma-alumina. The gamma-alumina contained 1.18 percent by weight of $Na_2O$. In addition, the gamma-alumina had a BET surface area of about 177 square meters per gram and a particle size such that the gamma-alumina passed a No. 8 sieve and was retained on a No. 18 sieve. The impregnated alumina was dried at about 160° C. for about 2 hours. The dried material was then roasted at 400° C. for about 5 hours. At this time, the impregnated alumina was an olive green color. On X-ray diffraction examination, no separate phase for copper oxide was detected. Instead, all the metal oxides had been transformed into a single phase.

generation, the so-prepared reagent was used to remove oxygen from a stream of nitrogen containing about 200 parts per million of oxygen. The stream of nitrogen was passed through the bed at a flow rate of 3,300 liters per liter of reagent bed volume per hour. Before each run, regeneration or reduction was carried out at a different temperature.

Before the first run, reduction had been carried out at a temperature of 100° C. On passing the nitrogen-oxygen mixture through the reagent bed over a 4 to 6 hour period, the effluent from the column initially showed an oxygen concentration below about 1 part per million. After about 1 cubic centimeter of oxygen per gram of reagent had been passed into the bed, the reagent was still removing 90 percent of oxygen from the nitrogen stream.

On regenerating the reagent at a temperature of 150° C. and on again exposing the reagent at ambient room temperature to the nitrogen stream containing 200 parts per million oxygen, about the same results were obtained as in the first run.

In a third run the reagent was regenerated at a temperature of 200° C. On passing the nitrogen stream containing oxygen through the reagent, oxygen removal was very close to 100 percent until about 0.1 cubic centimeter of oxygen per gram of reagent had been brought into the bed. After 1.25 cubic centimeters of oxygen per gram of reagent had been brought into the bed, the reagent was still removing 98 percent by volume of the oxygen present in the nitrogen stream. After 1.75 cubic centimeters of oxygen per gram of reagent had been brought into the bed, the reagent was still removing 90 percent by volume of the oxygen present in the nitrogen stream.

In a fourth run the reagent was regenerated at a temperature of 270° C. The so-prepared reagent removed substantially 100 percent of the oxygen from the nitrogen stream until 2.06 cubic centimeters of oxygen per gram of catalyst had been passed into the bed. After 2.3 cubic centimeters of oxygen per gram of reagent had been passed into the bed the reagent was still removing about 98 percent of the oxygen from the nitrogen stream. On passing 2.6 cubic centimeters of oxygen per gram of reagent into the bed the reagent was still removing about 90 percent of the oxygen from the nitrogen stream.

On repeated regeneration, the foregoing behavior was substantially repeated even after 8 to 10 cycles for the same charge of reagent.

In additional tests made by way of comparison, a reagent was employed which comprised copper dispersed on magnesium silicate support. The material was purchased from BASF Colors and Chemicals of New York, N.Y. The copper content of the material was about 24 percent by weight when the material was in the oxidized condition. The material was made up of pellets of uniform size, 5 millimeters in diameter and from 3 to 8 millimeters long. The bulk density of the material was about 1.1 grams per cubic centimeter.

The comparison material was placed in the iron pipe section described hereinabove and reduced with the nitrogen-hydrogen stream described while the material was maintained at a temperature of about 150° C. On passing into the bed the said nitrogen stream containing 200 parts per million of oxygen, the efficiency of oxygen removal fell off steeply from 100 to 90 percent and less. The reagent was removing only 90 percent of the oxygen from the nitrogen stream after a little less than 0.1 cubic centimeters of oxygen per gram of reagent had been passed into the bed.

On regenerating the comparison material at a temperature of 270° C. the oxygen removal efficiency fell off to 98 percent by volume after only about 0.1 cubic centimeters of oxygen per gram of reagent had been passed into the bed. The removal efficiency of the comparison material fell to 90 percent after only 0.34 cubic centimeter of oxygen per gram of material had been passed into the bed.

As yet an additional example of the reagent of the present invention and the method of preparing and using the same, a copper nitrate solution containing nitrates of activator metals was made up in the same quantity and in the same manner as in the example just described. This impregnating solution was also dispersed on 747 grams of gamma-alumina. The gamma-alumina contained 0.29 percent by weight of $Na_2O$. In addition, the gamma-alumina had a BET surface area of about 163 square meters per gram and a particle size such that the gamma-alumina passed a No. 8 sieve and was retained on a No. 18 sieve. The impregnated alumina was dried and roasted as in the example just described, yielding a single phase mixed oxide having a light green color.

About 128 grams of the roasted impregnated gamma-alumina was packed in the column described in the previous example and reduced, while at a temperature of 270° C., by passing a stream of hydrogen containing about 90 percent by volume of nitrogen through the column for about 30 minutes. The reduced material was oxidized by passing a stream of nitrogen containing about 5 percent by volume of oxygen through the bed slowly for about 30 minutes while the column and reagent were at a temperature of about 25–50° C. The reagent was then regenerated with the said stream of hydrogen at a temperature of 270° C. before use for the removal of oxygen from a stream of nitrogen containing about 200 parts per million of oxygen. The stream of nitrogen at ambient room temperature was passed through the bed at a flow rate of about 3,300 liters per liter of reagent bed volume per hour and over a 4 to 6 hour period. The effluent from the column initially showed an oxygen concentration below about 1 part per million. The oxygen removal efficiency did not fall below about 100 percent until 3.25 cubic centimeters of oxygen per gram of reagent had been passed into the bed. The oxygen removal efficiency did not fall below 98 percent until 3.5 cubic centimeters of oxygen per gram of reagent had been passed into the bed. Only after 4.0 cubic centimeters of oxygen per gram of reagent had been passed into the bed did the oxygen removal efficiency fall below 90 percent.

The present reagent is particularly characterized by its ability to remove paramagnetic gas from a gas stream at substantially 100 percent efficiency, i.e., to less than about 1 part per million, even after repeated regeneration of the reagent. The reagent can also handle very large flow rates at somewhat lower paramagnetic gas removed efficiencies.

The reagent and method of using the same according to the present invention having now been described, various modifications will at once be apparent to those skilled in the art and the scope of the invention is to be considered limited only by the breadth of the claims hereafter appended.

We claim:

1. The method of reducing the concentration of a paramagnetic gas selected from the group consisting of $O_2$, $O_3$, NO and $NO_2$ and mixtures thereof in a gas stream containing the same which comprises:

preparing an aqueous solution of a copper salt, and, an amount of activator metal salt to provide up to 45 percent by weight of activator metal, based on the total weight of reduced metal on subsequent reduction, said solution being acidified by an acid selected from the group consisting of nitric acid, sulfuric acid and hydrochloric acid, said copper salt being selected from the group consisting of copper nitrate, copper sulfate and copper chloride, and said activator metal salt being a simple neutral nitrate or sulfate or chloride of at least one metal element selected from the group consisting of silver, platinum, palladium, manganese, nickel, cobalt, chromium and molybdenum;

impregnating a high surface area gamma-alumina with the requisite amount of said aqueous solution to provide from about 3 to 13 percent by weight of reduced copper metal when the impregnated gamma-alumina is subsequently dried, roasted and subjected to a reducing atmosphere, the gamma-alumina containing from about 0.1 to about 1.5 percent by weight of $Na_2O$, the gamma-alumina having a surface area of at least 10 square meters per gram, and the gamma- alumina having a particle size range passing about a No. 8 to a No. 18 sieve (U.S. Sieve Series);

drying the impregnated gamma-alumina at a temperature in the range of about 110° to 160° C.;

roasting the dried gamma-alumina at a temperature in the range of about 250° to 400° C., whereby the copper salt is converted to oxide and becomes a single phase with the gamma-alumina, as determined on examination by X-ray diffraction;

passing a stream of hydrogen gas over the roasted gamma-alumina for at least about 30 minutes while the gamma-alumina is at a temperature in the range of about 100° C. to 400° C., thereby to reduce oxidized copper present with the gamma-alumina to finely-divided copper metal reactant, thus providing reagent for gas treatment; and passing said gas stream containing paramagnetic gas over said reagent while the reagent is contained in an enclosed zone.

2. The method as in claim 1 in which there is employed copper salt and zero quantity of activator metal salt.

3. The method as in claim 1 in which the following steps are additionally carried out after passing the gas stream containing paramagnetic gas over the reagent;

shutting off the flow of said gas;

passing a stream of hydrogen gas over said reagent for at least 30 minutes while the reagent is at a temperature of about 100 to 400° C. thereby to regenerate the reagent;

shutting off the flow of said hydrogen gas; and repeating the foregoing sequence of steps periodically and cyclically, including the step of passing the gas stream over the reagent, whereby the reagent is repeatedly regenerated and re-used.

4. The method as in claim 3 in which the regeneration and re-use cycle described is carried out at least six times.

5. The method as in claim 3 in which the reagent is maintained at a temperature of at least 250° C. during regeneration thereof.

6. The method as in claim 1 in which a sufficient amount of activator metal salt is used to provide up to about 20 percent by weight activator metal in the copper metal reactant based on the weight of the reactant.

7. The method as in claim 1 in which the stream of hydrogen gas contains at least 10 percent by volume hydrogen and the balance nitrogen.

8. The method as in claim 1 in which the paramagnetic gas content of the gas stream being treated is reduced to less than about 1 part per million.

9. The method as in claim 1 in which the space velocity through the enclosed zone is at least about 220 liters per liter of reagent bed volume per hour.

10. The method as in claim 1 in which the paramagnetic gas is $O_2$.

References Cited

UNITED STATES PATENTS 3,050,363   8/1962   Veal _____ 23—25

FOREIGN PATENTS 835,751   5/1960   Great Britain _____ 23—25

EARL C. THOMAS, Primary Examiner

U.S. Cl. X.R.

423—240, 239, 210; 252—466, 470, 471, 474, 476

PO-1050
(5/69)

UNITED STATES PATENT OFFICE
CERTIFICATE OF CORRECTION

Patent No. 3,682,585　　　　　　　　　　Dated　　8 August 1972

Inventor(s)　　Ludo K. Frevel and Leonard J. Kressley

It is certified that error appears in the above-identified patent and that said Letters Patent are hereby corrected as shown below:

Column 4, line 38, delete "10°" and insert --110°--.

Column 5, Table II, following Test No. 16 under the heading "Space velocity liter/hr." delete "48" and insert --480--.

Column 5, Table II, following Test No. 16, under the heading "Feed", delete "NO." and insert --$NO_2$--.

Signed and sealed this 13th day of February 1973.

(SEAL)
Attest:

EDWARD M. FLETCHER, JR.　　　　　　　ROBERT GOTTSCHALK
Attesting Officer　　　　　　　　　　Commissioner of Patents